Figure 1:
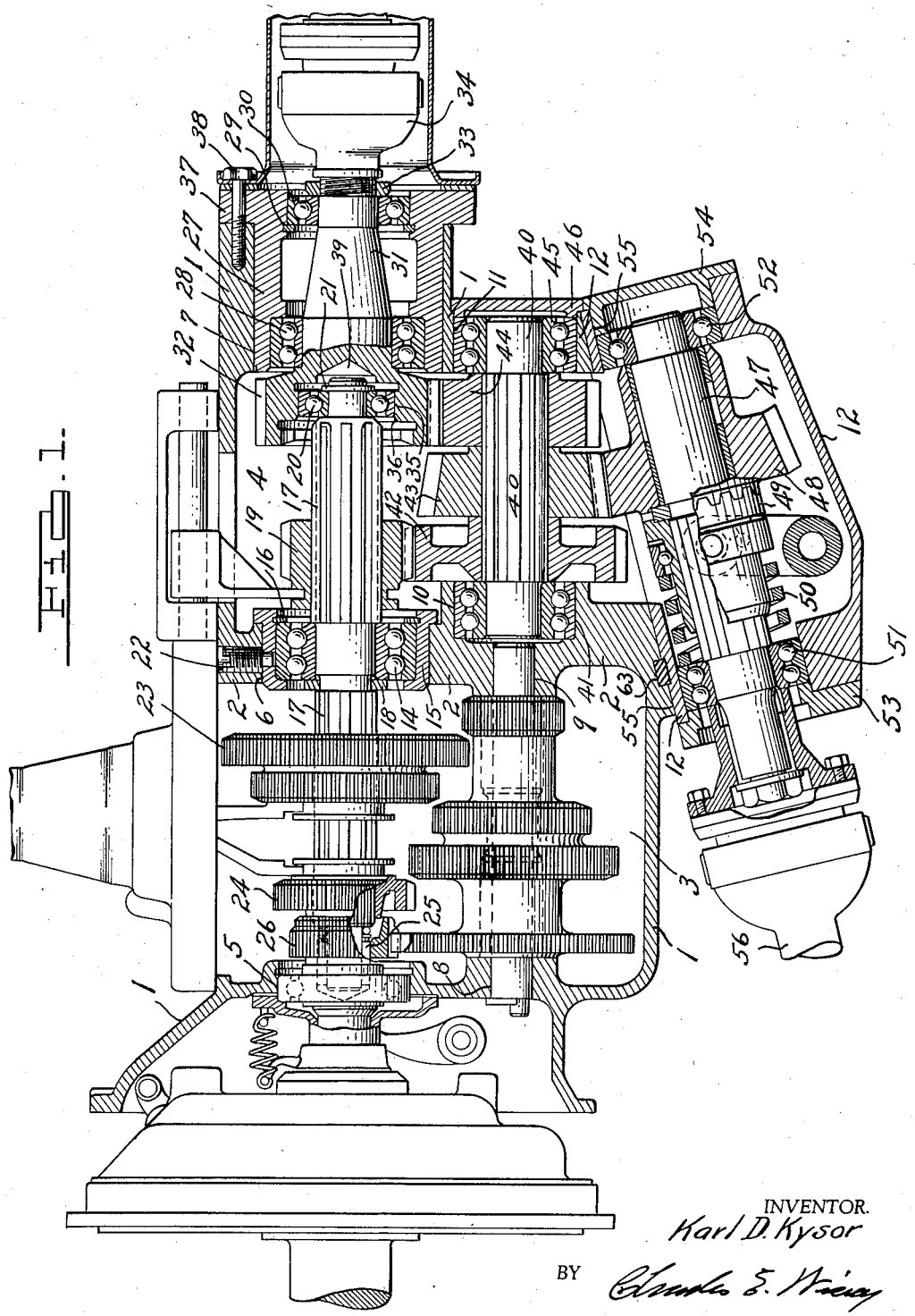

Dec. 3, 1940.  K. D. KYSOR  2,223,522

FOUR WHEEL DRIVE TRANSMISSION

Filed June 13, 1936

INVENTOR.
Karl D. Kysor
BY
ATTORNEY.

Patented Dec. 3, 1940

2,223,522

UNITED STATES PATENT OFFICE 2,223,522

FOUR WHEEL DRIVE TRANSMISSION

Karl D. Kysor, Northville, Mich.

Application June 13, 1936, Serial No. 84,986

7 Claims. (Cl. 74—326)

This invention relates to four-wheel drive transmissions and one object of the invention is to provide a housing for a four-wheel drive transmission formed in three compartments, one portion of the transmission housing having a double compartment containing the usual transmission gears and the transfer gears and provided with a partition between the two sets of gears and the third compartment being in the form of a housing cover bolted onto the lower part of the main housing beneath the transfer gears and carrying the front wheel drive mechanism.

Another object of the invention is to provide a transmission housing having a central partition between the transfer gears and the usual transmission gears and carrying the mechanism for the propeller shaft drive, a housing cover being bolted on beneath the transfer gears and carrying the mechanism including acute angle beveled gears for the front wheel drive shaft.

A further object of the invention is to provide a combined transmission and transfer gear housing in a single unit having three integral walls which may all be bored at the same time to insure accurate alignment of the shafts.

A further object of the invention is to provide a four-wheel drive transmission which may be readily and accurately assembled and is so designed as to maintain extremely accurate alignment of the shafts and bearings, which are required to support and drive the gears, as well as to maintain accurate alignment of the gears themselves and provide extraordinarily rigid support for the said shafts and gears thus reducing shaft deflection to very nearly zero with its obvious advantages in durability, quietness and the ability to carry very high torques without overstressing the parts.

Another object of the invention is to provide a straight line drive to both front and rear axles so that the universal joints normally operate at the angle of zero and only change from this angle due to spring motion.

A further object of the invention is to incorporate the combined mechanism in a unit which brings the transfer case gears up close to the engine.

These objects and the several novel features of the invention are hereinafter more fully described and claimed, and the preferred form of construction by which these objects are attained is shown in the accompanying drawing in which—

Fig. 1 is a section through a four-wheel drive transmission embodying my invention.

The device comprises a housing 1 having a vertical partition 2 intermediate the ends of the housing and dividing the housing into two compartments 3 and 4. This housing is provided with a longitudinal bore forming openings 5, 6 and 7 in the three vertical walls of the housing. These bores 5, 6 and 7 are all concentric and may be all bored at one time assuring proper axial alignment of the bores. Also, the countershaft bores 8, 9, 10 and 11 may also all be made at the same time assuring axial alignment of the countershaft bores. The chamber or compartment 3 contains the usual four speed transmission gears while the chamber or compartment 4 contains the transfer gears and a separate housing cover 12 is secured to the bottom of the housing 1 and is keyed thereto by the cross keys 63 and is also bolted thereto and this housing cover 12 contains the front wheel drive gear 48 which is thus positioned beneath the transfer gear compartment 4.

In assembling the gearing, the double roll ball bearing 14 is pressed into the bearing cage 15 and secured in place by the snap ring 16 fitting the groove in this cage. The splined shaft 17 is then pushed through the bore or inner race of the bearing 14 and the snap ring 18 is fitted in a groove therefor in the shaft 17 as shown. The gear 19 is then slid onto the splines on the right hand end of the shaft 17 and the bearing 20 is pressed onto the right hand stub end of the shaft 17 and is secured in place by the snap ring 21. This assembly is all done at the bench where full visibility and maximum accessibility are assured. The whole assembly including the shaft 17, bearing 14, bearing cage 15, gear 19 and bearing 22 together with their locking members consisting of the snap rings 16, 18 and 21 is assembled into the housing through the bore 7 at the rear of the housing 1 and these parts are locked in position by the shoulder screw 22 engaging in the bearing cage 15. It is, of course, obvious to anyone familiar with transmission assembly, that the two transmission gears 23 and 24 are slid over the splines at the left hand side of the bearing 14 as the shaft 17 goes into place and that the pilot bearing 25 is in place on the left hand stub end of the shaft 17 and slides into place inside of the stem pinion 26 in the usual manner. The pinion 26 is also known to the trade as the clutch pinion since the left hand end or stem of the pinion 26 forms a clutch pilot.

It is obvious that this assembly is handled in exactly similar manner to the assembly of the main shaft of an ordinary automotive transmission, except that the bearing 14 is locked to the shaft 17 by a shoulder on the shaft 17, and the snap ring 18 which in combination with the bearing cage 15 and snap ring 16 together with the shoulder screw 22 allows free rotation of the shaft 17 but will carry thrust loads from any direction. This limits endwise movement of the shaft 17 to a very small extent in either direction. It is obvious that this relationship of parts allows the handling of this assembly in the orthodox manner and, at the same time, provides a continuous housing for both the transmission gears and transfer case gears with a complete vertical wall on both sides of both sets of gears in which the wall 2 is common to both compartments.

The bearing cage 27 is provided with a double roll ball bearing 28 pressed into the end thereof as shown. A snap ring 29 is snapped into a groove provided therefor in the bearing cage 27 and a bearing 30 is pressed into the end of the bearing cage 27 at the right hand end of Fig. 1 and up against the snap ring 29. The hub 31 of the gear 32 is then pushed through the bearings 28 and 30 previously located in position in the bearing cage 27. A nut 33 is then threaded onto the right hand end of the hub 31. Drawing up the nut 33 a predetermined amount will then pre-load the bearings 28 and 30 and very rigidly support the gear 32 both radially and axially. The nut 33 may then be locked in place by using any desirable form of standard bearing nut lock.

Though not here shown, the extending end of the hub 31 is preferably splined or tapered so that the universal joint 34 may be readily attached thereto to drive the propeller shaft to the rear wheels of the vehicle. The entire assembly of the gear 32, cage 27, bearings 28 and 30, snap rings 29 and nut 33 is slid into the housing bore 7 in which the outside diameter of the cage 27 is a snug fit. The gear 32 is provided with an annular internally ground face 35 and with a pilot taper 36 which slides over the outside diameter of the bearing 20 and the flange 37 of the cage 27 comes to a stop against the mating shoulder of the main housing and is secured thereto by the screws 38.

It will be noted that clearance is provided between the right hand end of the shaft 17 and the bottom of the recess in the gear 32. This construction gives completely independent support for the gear 32 and its hub 31 as well as an outboard support for the right hand end of the shaft 17 thus making possible a one-piece housing with transfer gears separated from the transmission gears by a vertical housing wall 2, thus providing a wall on each side of the transfer gears and a wall on each side of the transmission gears in which the central wall 2 is common to both sides. Thus, three vertical walls are provided and by the above mentioned combination of mechanical elements, a balanced design is produced with a maximum of retained or sustained accuracy since the bearing walls are all bored in line in a solid case at the same time. This design also gives much greater rigidity than is possible in using a case or a housing divided in a vertical plane.

The countershaft 40 in the transfer case is assembled by pressing the double roll ball bearing 41 into the counterbore 10 in the wall 2 of the main housing. The gears 42, 43 and 44 are inserted through the opening in the bottom of the case beneath the transfer gears before the housing cover 12 is mounted in place. The splined shaft 40 is then inserted through the mating splines in the three gears 42, 43 and 44 and the left hand stub end of the splined shaft 40 is pushed into the bore of the bearing 41 in which it is a light press fit. The double roll ball bearing 45 is then pushed into the bore 11 in the rear wall of the transmission housing and over the right hand stub end of the shaft 40 on which the bearing bore is a size to size fit. The housing cap 46 is then secured in place to the rear face of the transmission housing by cap screws not here shown.

The shaft 47 for driving the front wheels of the vehicle together with the acute angle bevel gear 48, clutch member 49, spring 50, bearings 51 and 52 and caps 53 and 54 are all assembled into the lower housing cover 12 at the bench and become a separate sub-assembly which is bolted to the lower angular face 55 of the main transmission housing 1. The cross keys 63 locate the lower housing cover 12 and take fore and aft strains between the housing cover 12 and the main housing 1.

It will thus be seen that the whole mechanism of transmission gears, transfer case and front wheel drive unit is a single unit assembly which bolts onto the rear face of the motor bell housing and can be made to suit any existing motor bell housing shape. The assembly of the whole unit to the motor follows standard existing practice for the assembly of the unit power plants.

When this unit is bolted to the motor bell housing, a complete assembly is provided consisting of motor, flywheel, clutch, transmission gears, transfer gears and drive for both front and rear axles with virtually no angularity between the driven shaft of the transfer case and the propeller shaft for the rear axle and between the shaft 47 and propeller shaft for the front axle. It is to be noted that the standard automotive four-speed transmission in the compartment 3 of the transmission housing combined with the two-speed transfer case 4 can be substituted for any standard automotive transmission employing the same size and type of bell housing by simply removing the old transmission and substituting this one. The power plant of a two-wheel drive vehicle is then converted into a complete power plant for a four-wheel drive vehicle with power drive in a straight line to both front and rear axles. Any good type of power driven front axle design may then be assembled to the spring and steering mechanism at the front of the vehicle and upon connecting the propeller shafts, a complete four-wheel drive vehicle is produced with the least amount of labor and time. The clutch member 49 and spring 50 about the shaft 47 is utilized to release the torque differences between the front and rear axles and is the subject matter of a separate application Serial No. 102,070, filed September 23, 1936. The acute angle bevel gear 48 meshes with the acute angle bevel gear 43 of the transfer case and when the gear 19 is in the position shown, the drive to the rear axle is through the gear 19, gear 42, splined shaft 40, gear 44 and gear 32 of the propeller shaft. At the same time, the rotation of the splined shaft causes the acute angle bevel gear 43 to rotate the mating acute angle bevel gear 48. This acute angle bevel gear 48 through the clutch 49 rotates the front axle propeller shaft 56.

It has been the usual practice to provide an automotive vehicle with a transmission usually spaced from the engine, which transmission has a power output shaft connected with the propeller shaft extending to the rear axle. Four wheel drive mechanism heretofore known introduces a transfer case positioned to the rear of the transmission a considerable distance which is actuated by the power output shaft of the transmission and the front and rear axles are driven by a power takeoff from the transfer case to both the front and rear axles. These two power take-offs of the transfer case are in axial alignment and the transfer case has been positioned usually nearly centrally of the vehicle in order that the drive shaft to the front wheels will not be positioned at too sharp an angle to the horizontal. In so positioning the transfer case it is subject to distortion through the flexing of the frame elements and also gives rise to a considerable number of universal joint connections all of which absorb power.

In my improved power transmission mechanism, I provide a unit power plant. The housing for the transmission is attached directly to the engine casing or bell housing of the motor as previously stated and as shown in the drawing, the engine shaft and the shaft for the power takeoff to the rear axle are in axial alignment. This provides a compact power unit and may be suspended in the vehicle frame at three points and distortion of the power unit by the flexing of the frame members thus reduced to a minimum. The number of universal joints necessary to be used with my improved unitary power plant is reduced to three—that is, the two universals shown at 34 and 56 and the universal at the point of connection of the shaft extending from the universal 56 to the front drive (not here shown). The usual universal joints required with the previous construction are five in number as there is required a universal joint between the transfer case and the transmission mechanism, a joint between the transfer case and the propeller shaft, a joint between the propeller shaft and the rear axle drive and the two universals in the propeller shaft driving the front axle.

Further, inasmuch as the prior art structures have the transfer case positioned considerably to the rear of the transmission case, any necessity of tilting the transfer case due to location of the power output shaft tends to throw the power output shaft to the front axle out of alignment. Applicant, by this arrangement of the unitary power unit, has reduced the cost of manufacture as compared to the cost of the separate transfer and transmission cases and also reduced the cost of installation and further has secured a superior operative structure in that the whole power unit can be mounted upon a three point suspension in respect to the frame and the strains are all taken in the single casing which is more capable of withstanding the strains thereon imposed by the driving shafts than is the case where the transmission is spaced from the engine and the transfer case spaced from the transmission case which in its very nature of arrangement more readily permits a relative displacement of the several parts thereby naturally reducing the nicety of operation of the parts and produces greater wear and involves a greater liability of getting out of order.

From the foregoing description it becomes evident that the device may be readily assembled with a minimum amount of time and labor, provides true axial alignment of the shafts due to the fact that the main and counter-shaft bores may be all produced at the same time on their respective axes, provides a means for driving both the front and rear axles direct from the transmission by a compact transmission unit having a one-piece housing and provides a device which accomplishes the objects described.

Having thus fully described my invention, its utility and mode of operation, what I claim and desire to secure by Letters Patent of the United States is—

1. In a transmission for automotive vehicles having an engine, a power output shaft, and front and rear driven axles, a housing having end walls and an intermediate vertical wall between the end walls providing two compartments, the three walls being bored in alignment, a drive shaft rotatably mounted in said bores and extending through both compartments and held in axial alignment with the power output shaft of the engine, transmission gearing connected to the drive shaft in one compartment, transfer gearing connected to the drive shaft in the other compartment, a countershaft in each compartment, the countershafts being in axial alignment and the three walls being bored in alignment to receive the countershafts, a housing cover secured to said housing beneath the transfer gearing compartment, a front wheel drive shaft rotatably mounted in said housing cover and extending at an angle to the transmission drive shaft, an acute angle bevel gear on the countershaft in the transfer gear compartment and an acute angle bevel gear on the font wheel drive shaft meshing with the aforesaid acute angle gear.

2. In a transmission for automotive vehicles having an engine, a power output shaft, and front and rear driven axles, a housing having end walls and an intermediate wall between the end walls, providing two compartments the three walls being bored in alignment, a drive shaft rotatably mounted in the bored openings in the walls and held in axial alignment with the power output shaft of the engine, transmission gearing connected to the drive shaft between the intermediate wall and one end wall and transfer gearing connected to the drive shaft between the intermediate wall and the other end wall of said housing, a cover secured to said housing beneath the transfer gearing, a front wheel drive shaft rotatably mounted in said housing cover and extending at an angle to the transmission drive shaft, a gear on the front wheel drive shaft, and means for driving said gear from the transfer gearing.

3. In a four-wheel drive transmission for automotive vehicles having an engine, a power output shaft, and front and rear driven axles the combination with a front and rear axle, a propeller shaft for the rear axle in axial alignment with the power output shaft of the engine and a drive shaft for the front axle, the front axle drive shaft extending at an angle to the propeller shaft, a transmission housing having end walls and an intermediate wall between the end walls dividing the housing into two compartments, transmission gearing including a shaft aligned with the power output of the shaft of the engine mounted in one compartment, transfer gearing mounted in the other compartment, the bottom of the transfer compartment being open, a housing cover for said opening and secured to the housing, the drive shaft being rotatably mounted in the housing cover, an acute angle bevel gear driven by the transfer gearing and an acute angle bevel gear meshing therewith and connected to rotate said drive shaft.

4. In a four-wheel drive transmission, for automotive vehicles having an engine, a power output shaft, and front and rear axles, a propeller shaft for the rear axle and a drive shaft for the front axle extending at an angle to the propeller shaft, a transmission housing having two compartments, transmission gearing including a shaft aligned with the power output of the shaft of the engine in one compartment, transfer gearing in the other compartment and the drive shaft also being rotatably mounted in said other compartment, an acute angle bevel gear rotatably mounted in the compartment with said transfer gear and arranged to be driven thereby, and an acute bevel gear on the front wheel drive shaft meshing with the aforesaid acute angle bevel gear.

5. In a transmission, a unitary power transmitting mechanism comprising a housing having end walls and an intermediate vertical wall between the end walls dividing the housing into two compartments, transmission gearing mounted in one compartment, transfer gearing mounted in the other compartment, the bottom of the transfer compartment being open, a housing cover for said opening and secured to the housing, a shaft rotatably mounted in the housing cover, an acute angle bevel gear driven by the transfer gearing, and an acute angle bevel gear meshing therewith and connected to rotate said shaft.

6. In a transmission for automotive vehicles having an engine including a housing, a transmission housing secured directly to the engine housing to form a rigid unitary power unit and having end walls and an intermediate wall between and in parallel relation with the end walls, transmission gearing mounted on one side of said intermediate wall, transfer gearing mounted on the other side of said intermediate wall, a housing cover secured to said transmission housing beneath the transfer gearing, a shaft rotatably mounted in the housing cover, an acute angle bevel gear connected to rotate said shaft, and an acute angle bevel gear driven by the transfer gearing and meshing with the aforesaid acute angle bevel gear.

7. In a transmission rigidly secured to the engine housing to form a unitary power plant, a housing having end walls and an intermediate wall between the end walls forming two compartments, transmission gearing mounted in one compartment, transfer gearing mounted in the other compartment, a housing cover secured to said housing beneath the transfer gearing, a front wheel drive shaft rotatably mounted in said housing cover, and means for driving said front wheel drive shaft from the transfer gearing.

KARL D. KYSOR.